(12) United States Patent
Saimen et al.

(10) Patent No.: US 9,401,527 B2
(45) Date of Patent: Jul. 26, 2016

(54) ELECTROLYTE-POSITIVE ELECTRODE STRUCTURE, AND LITHIUM ION SECONDARY BATTERY COMPRISING THE SAME

(71) Applicant: HONDA MOTOR CO., LTD., Minato-Ku, Tokyo (JP)

(72) Inventors: Kazuki Saimen, Saitama (JP); Yuki Ito, Saitama (JP); Hayato Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 14/230,100

(22) Filed: Mar. 31, 2014

(65) Prior Publication Data

US 2014/0302399 A1      Oct. 9, 2014

(30) Foreign Application Priority Data

Apr. 4, 2013   (JP) .................................. 2013-078503
Feb. 17, 2014  (JP) .................................. 2014-027839

(51) Int. Cl.
*H01M 10/00*      (2006.01)
*H01M 10/0525*    (2010.01)
*H01M 10/0565*    (2010.01)

(52) U.S. Cl.
CPC ...... *H01M 10/0525* (2013.01); *H01M 10/0565* (2013.01); *Y02E 60/122* (2013.01)

(58) Field of Classification Search
CPC .................... H01M 10/0525; H01M 10/0565; Y02E 60/122
USPC .................................................. 429/306, 308
See application file for complete search history.

(56) References Cited

U.S. PATENT DOCUMENTS 6,372,387 B1 *  4/2002  Kawakami .......... H01M 10/052
                                                    429/188

FOREIGN PATENT DOCUMENTS

JP         2001-015164 A       1/2001

* cited by examiner

*Primary Examiner* — Cynthia H Kelly
*Assistant Examiner* — Monique Wills
(74) *Attorney, Agent, or Firm* — Carrier Blackman & Associates, P.C.; William D. Blackman; Anne G. Sabourin

(57) ABSTRACT

There are provided an electrolyte-positive electrode structure which comprises a thin solid electrolyte and can develop excellent capacity and output, and a lithium ion secondary battery comprising the same. An electrolyte-positive electrode structure 7 comprises: a positive electrode 4 comprising a positive electrode active material layer 3 formed on a current collector 2; and a solid electrolyte 6 containing inorganic particles having lithium ion conductivity, an organic polymer, and a polymer gel, in which the organic polymer binds the inorganic particles and can be impregnated with the polymer gel, and the polymer gel holds an electrolyte solution and is impregnated into the organic polymer, wherein the positive electrode active material layer 3 is integrated with the solid electrolyte 6 using the organic polymer as a medium.

14 Claims, 12 Drawing Sheets

ELECTROLYTE-POSITIVE ELECTRODE STRUCTURE, AND LITHIUM ION SECONDARY BATTERY COMPRISING THE SAME

BACKGROUND OF THE INVENTION

1. Field of the Invention

The present invention relates to an electrolyte-positive electrode structure and a lithium ion secondary battery comprising the same.

2. Description of the Related Art

In recent years, the use of a solid electrolyte instead of a liquid electrolyte (electrolyte solution) as a medium for conducting lithium ions has been studied in lithium ion secondary batteries. The solid electrolyte does not cause leakage of an electrolyte solution and can suppress the growth of a lithium dendrite to prevent the short circuit in the battery.

As the solid electrolyte, for example, there is proposed a solid electrolyte in which a sheet-shaped polymer material is impregnated with a nonaqueous electrolyte solution, the sheet-shaped polymer material containing a glass ceramic powder which is represented by the chemical formula $Li_{1+x+y}Al_xTi_{2-x}Si_yP_{3-y}O_{12}$ ($0 \leq x \leq 0.4$, $0 < y \leq 0.6$) and has lithium ion conductivity (see Japanese Patent Laid-Open No. 2001-015164).

The solid electrolyte is sandwiched between a positive electrode and a negative electrode which are respectively separately produced to form a lithium ion secondary battery.

Incidentally, in the lithium ion secondary battery using the solid electrolyte, it is conceived to form the solid electrolyte into a thin film to thereby reduce resistance to increase capacity and output.

However, there is an inconvenience that if the solid electrolyte is formed into a thin film having a thickness of, for example, less than 50 μm, the solid electrolyte itself cannot have sufficient strength and will be liable to be damaged, so the solid electrolyte cannot be formed into a thin film.

An object of the present invention is to provide an electrolyte-positive electrode structure which comprises a thin solid electrolyte and can develop excellent capacity and output, and to provide a lithium ion secondary battery comprising the electrolyte-positive electrode structure, by solving such an inconvenience.

SUMMARY OF THE INVENTION

In order to achieve such an object, the present invention provides an electrolyte-positive electrode structure used in a lithium ion secondary battery, the electrolyte-positive electrode structure comprising: a positive electrode comprising a positive electrode active material layer formed on a current collector, and a solid electrolyte containing inorganic particles having lithium ion conductivity, an organic polymer, and a polymer gel in which the organic polymer binds the inorganic particles and can be impregnated with the polymer gel, and the polymer gel holds an electrolyte solution having lithium ion conductivity and is impregnated into the organic polymer, wherein the positive electrode active material layer is integrated with the solid electrolyte using the organic polymer as a medium.

In the solid electrolyte of the electrolyte-positive electrode structure of the present invention, the inorganic particles are bound by the organic polymer, and the organic polymer is impregnated with the polymer gel holding the electrolyte solution. Then, the solid electrolyte is joined to and integrated with the positive electrode active material layer formed on the current collector by the organic polymer. Thereby, the solid electrolyte is supported by the positive electrode. Thus, according to the electrolyte-positive electrode structure of the present invention, the solid electrolyte can be formed into a thin film because the positive electrode active material layer ensures a desired strength of the solid electrolyte and allow its damage to be avoided. As a result, according to the electrolyte-positive electrode structure of the present invention, the thickness of the whole lithium ion secondary battery can be reduced.

In the electrolyte-positive electrode structure of the present invention, since the contact between the solid electrolyte and the positive electrode active material layer of the positive electrode is good, lithium ions can easily conduct between the solid electrolyte and the positive electrode active material layer to reduce the interfacial resistance between the solid electrolyte and the positive electrode active material layer to suppress excess voltage, thus capable of developing excellent capacity and output.

Incidentally, in order to increase the capacity density of a lithium ion secondary battery, the electrolyte-positive electrode structure of the present invention is expected to be applied to a lithium ion secondary battery comprising a negative electrode in which a negative electrode active material layer containing a negative electrode active material made of a high capacity material capable of occluding lithium ions such as lithium, silicon, and tin is formed on a current collector. However, in the case where the reduction potential on the basis of the potential of $Li^+/Li$ electrode reaction of the inorganic particles constituting the solid electrolyte of the electrolyte-positive electrode structure of the present invention is higher than that of the high capacity material, when the electrolyte-positive electrode structure is used in a lithium ion secondary battery, oxidation-reduction reaction may occur at the interface of the solid electrolyte and the negative electrode active material layer aside from the cell reaction to reduce and deteriorate the solid electrolyte.

Therefore, in the electrolyte-positive electrode structure of the present invention, the inorganic particles are preferably made of a composite metal oxide which is represented by the chemical formula $Li_{7-y}La_{3-x}A_xZr_{2-y}M_yO_{12}$ (wherein A is any one metal selected from the group consisting of Y, Nd, Sm, and Gd; x is in the range of $0 \leq x < 3$; M is Nb or Ta; and y is in the range of $0 \leq y < 2$) and has a garnet structure.

Examples of the inorganic particles include a composite metal oxide which is represented by the chemical formula $Li_7La_3Zr_2O_{12}$ or the chemical formula $Li_{7-y}La_{3-x}Y_xZr_{2-y}Ta_yO_{12}$ (wherein x is in the range of $0 \leq x < 3$, and y is in the range of $0 \leq y < 2$) and has a garnet structure. Examples of the composite metal oxide represented by the chemical formula $Li_{7-y}La_{3-x}Y_xZr_{2-y}Ta_yO_{12}$ include a composite metal oxide which is represented by the chemical formula $Li_{6.8}La_{2.95}Y_{0.05}Zr_{1.8}Ta_{0.2}O_{12}$, the chemical formula $Li_{6.8}La_{2.87}Y_{0.13}Zr_{1.8}Ta_{0.2}O_{12}$, or the chemical formula $Li_{6.6}La_{2.9}Y_{0.1}Zr_{1.6}Ta_{0.4}O_{12}$ and has a garnet structure.

The inorganic particles made of the composite metal oxide have a smaller reduction potential on the basis of the potential of $Li^+/Li$ electrode reaction than a high capacity material capable of occluding lithium ions such as lithium, silicon, and tin. Therefore, when the electrolyte-positive electrode structure comprising the inorganic particles made of the composite metal oxide is used in a lithium ion secondary battery, it can suppress the oxidation-reduction reaction at the interface of the solid electrolyte and the negative electrode active material layer from occurring aside from the cell reaction and prevent the solid electrolyte from being reduced and deteriorated.

The inorganic particles in the solid electrolyte can be present in high density, and the solid electrolyte itself can be formed into a thin film to reduce resistance by having a particle size in the range of 0.5 to 20 µm, and particularly preferably have a particle size of 0.5 to 10 µm.

If a particle size of the inorganic particles is less than 0.5 µm, the inorganic particles aggregate and easily form secondary particles, and a result thereof, a uniformity of the solid electrolyte may be impaired. On the other hand, if a particle size of the inorganic particles is more than 20 µm, gaps formed between the adjacent inorganic particles become larger, and lithium dendrite may easily grow along the gaps. Further, if a particle size of the inorganic particles is more than 10 µm, it may suppress thinning of the solid electrolyte.

Further, examples of the organic polymer which binds the inorganic particles and can be impregnated with the polymer gel include carboxymethyl cellulose.

Further, the electrolyte solution may comprise a lithium salt and an organic solvent which dissolves the lithium salt. Examples of the lithium salt include one salt selected from the group consisting of $LiPF_6$ and $LiN(CF_3SO_2)_2$; and examples of the organic solvent include one or more solvents selected from the group consisting of ethylene carbonate, diethyl carbonate, and 1,2-dimethoxy ethane.

Further, examples of the polymer gel which holds the electrolyte solution and is impregnated into the organic polymer include one monomer selected from the group consisting of polyethylene glycol diacrylate, ethylene glycol dimethacrylate, and pentaerythritol trimethacrylate.

Further, in the electrolyte-positive electrode structure of the present invention, the solid electrolyte can reduce the thickness of the whole lithium ion secondary battery and ensure a predetermined strength by having a thickness in the range of 8 to 20 µm, and preferably has a thickness in the range of 8 to 15 µm.

If the thickness is less than 8 µm, the strength may be insufficient, and if it is more than 20 µm, the thickness of the whole lithium ion secondary battery cannot sufficiently be reduced.

Furthermore, the electrolyte-positive electrode structure of the present invention can be applied to a lithium ion secondary battery.

DETAILED DESCRIPTION OF THE PREFERRED EMBODIMENTS

Next, the embodiments of the present invention will be described in more detail with reference to the attached drawings.

Figure 1:
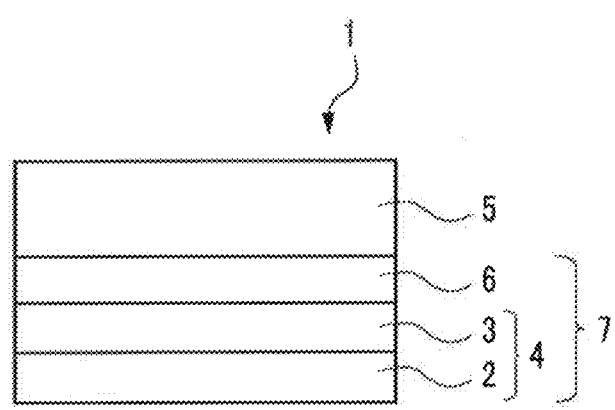
FIG. 1 is a descriptive sectional view showing the configuration of a lithium ion secondary battery comprising an electrolyte-positive electrode structure of the embodiments of the present invention.

As shown in FIG. 1, the lithium ion secondary battery 1 of the present embodiment comprises a positive electrode 4 comprising a positive electrode active material layer 3 formed on a positive electrode current collector 2, a negative electrode 5, and a solid electrolyte 6 disposed between the positive electrode 4 and the negative electrode 5. In the lithium ion secondary battery 1, the positive electrode active material layer 3 is integrated with the solid electrolyte 6 to form an electrolyte-positive electrode structure 7.

Examples of the positive electrode current collector 2 that can be used include a metal foil and a metal plate made of aluminum, stainless steel, and the like.

The positive electrode active material layer 3 contains a positive electrode active material such as a transition metal oxide, a composite oxide of lithium and a transition metal oxide, a transition metal sulfide, and an organic compound. Specific examples of the transition metal oxide that can be used include $MnO$, $V_2O_3$, $V_6O_{12}$, and $TiO_2$. Examples of the composite oxide of lithium and a transition metal oxide that can be used include lithium nickelate and lithium cobaltate. Examples of the transition metal sulfide that can be used include $TiS$, $FeS$, and $MoS_2$. Examples of the organic compound that can be used include polyaniline, polypyrrole, polyacene, a disulfide compound, a polysulfide compound, and a N-fluoropyridinium salt. Further, an iron lithium phosphate having an olivine structure can also be used as the positive electrode active material.

The positive electrode 4 can be obtained by forming the positive electrode active material layer 3, for example, by casting a paste prepared by mixing the positive electrode active material, a conductive aid, a binder, and a solvent on the positive electrode current collector 2 by a casting method using a doctor blade followed by drying. Examples of the conductive aid that can be used include Ketjen Black, acetylene black, and a flaky copper powder. Examples of the binder that can be used include polyimide, PVDF (polyvinylidene fluoride), and SBR (styrene-butadiene rubber). Examples of the solvent that can be used include distilled water and N-methyl-2-pyrrolidinone (NMP).

Examples of the negative electrode 5 that can be used include those formed by compression bonding a negative electrode active material layer on a negative electrode current collector. Examples of the negative electrode current collector that can be used include a metal foil made of copper, stainless steel, and the like and a wire net made of stainless steel. The negative electrode active material layer contains a negative electrode active material such as a metal comprising a high capacity material capable of occluding lithium and carbon. Examples of the metal that can be used include lithium, silicon, tin, and an oxide and an alloy containing these metals.

The solid electrolyte 6 contains inorganic particles having lithium ion conductivity, an organic polymer, and a polymer gel, wherein the organic polymer binds the inorganic particles and can be impregnated with the polymer gel, and the polymer gel holds an electrolyte solution having lithium ion conductivity and is impregnated into the organic polymer.

Examples of the inorganic particles that can be used include those made of a composite metal oxide which is represented by the chemical formula $Li_{7-y}La_{3-x}A_xZr_{2-y}M_yO_{12}$ (wherein A is any one metal selected from the group consisting of Y, Nd, Sm, and Gd; x is in the range of $0 \leq x < 3$; M is Nb or Ta; and y is in the range of $0 \leq y < 2$) and has a garnet structure.

The inorganic particles made of the composite metal oxide can be obtained by firing a mixed raw material prepared by mixing, for example, a Li compound, a La compound, and a Zr compound, and in addition, optionally, a compound of any one metal selected from the group consisting of Y, Nd, Sm, and Gd, and a compound of Nb or Ta.

Examples of the Li compound include LiOH or a hydrate thereof, $Li_2CO_3$, $LiNO_3$, and $CH_3COOLi$. Examples of the La compound include $La_2O_3$, $La(OH)_3$, $La_2(CO_3)_3$, $La(NO_3)_3$, and $(CH_3COO)_3La$. Examples of the Zr compound include $Zr_2O_2$, $ZrO(NO_3)_2$, $ZrO(CH_3COO)_2$, $Zr(OH)_2CO_3$, and $ZrO_2$.

Further, examples of the Y compound include $Y_2O_3$, $Y_2(CO_3)_3$, $Y(NO_3)_3$, and $(CH_3COO)_3Y$. Examples of the Nd compound include $Nd_2O_3$, $Nd_2(CO_3)_3$, $Nd(NO_3)_3$, and $(CH_3COO)_3Nd$. Examples of the Sm compound include $Sm_2O_3$, $Sm_2(CO_3)_3$, $Sm(NO_3)_3$, and $(CH_3COO)_3Sm$. Examples of the Gd compound include $Gd_2O_3$, $Gd_2(CO_3)_3$, $Gd(NO_3)_3$, and $(CH_3COO)_3Gd$.

Further, examples of the Nb compound include $Nd_2O_5$, $NbO_2$, $NbCl_5$, and $LiNbO_3$. Examples of the Ta compound include $Ta_2O_5$, $TaCl_5$, and $LiTaO_3$.

The firing includes grinding and mixing the mixed raw material with a grinding and mixing machine such as a ball mill, a mixer, and the like, followed by primary firing at a temperature in the range of 850 to 950° C. for 5 to 7 hours. Next, the fired body obtained in the primary firing is ground and mixed again with a grinding and mixing machine such as a ball mill, a mixer, and the like, followed by secondary firing by holding at a temperature in the range of 1000 to 1200° C. for 6 to 12 hours.

The inorganic particles made of the composite metal oxide obtained by the firing preferably have a particle size of 20 µm or less, particularly preferably 10 µm or less in order to be used as the lithium ion conducting material. If a large amount of particles having a particle size of more than 20 µm are contained, the inorganic particles obtained by the firing are ground by a grinding and mixing machine such as a ball mill, a mixer, and the like to provide a particle size of 20 µm or less. When the particle size of the inorganic particles is set to 20 µm or less, the inorganic particles in the solid electrolyte 6 can be present in high density, and the solid electrolyte 6 itself can be formed into a thin film to reduce the resistance.

The organic polymer constituting the solid electrolyte 6 is required to act as a binder of the inorganic particles, to be able to be impregnated with the polymer gel, and to be stable at the operating voltage of a lithium secondary battery. Examples of the organic polymer that can be used include one or more resins selected from the group consisting of polyolefins such as polyethylene and polypropylene, fluororesins such as polytetrafluorethylene (PTFE) and polyvinylidene fluoride, polyimides, acrylic resins, styrene-butadiene rubber (SBR), and carboxymethyl cellulose (CMC).

The polymer gel constituting the solid electrolyte 6 comprises an electrolyte solution comprising a lithium salt as a supporting electrolyte and an organic solvent which dissolves the lithium salt, and a polymer holding the electrolyte solution. The polymer gel holds the electrolyte solution preferably in the range of 30 to 95% by mass, particularly preferably in the range of 50 to 95% by mass, in order to have both lithium ion conductivity and mechanical strength as a polymer gel.

Examples of the lithium salt that can be used include $LiPF_6$, $LiBF_4$, $LiClO_4$, $LiCF_3SO_3$, and $LiN(CF_3SO_2)_2$.

Examples of the organic solvent include cyclic esters such as ethylene carbonate (EC), propylene carbonate (PC), and γ-butyrolactone (γ-BL), chain esters such as diethyl carbonate (DEC), ethyl methyl carbonate (EMC), and dimethyl carbonate (DMC), chain ethers such as 1,2-dimethoxyethane (DME) and 1,2-diethoxy ethane (DEE). These organic solvents can be used singly or in combination of two or more.

Examples of the polymers constituting the polymer gel that can be used include thermoplastic organic polymers such as polyethylene oxide (PEO), polyvinylidene fluoride (PVDF), and polyacrylonitrile (PAN), thermosetting polymers obtained by polymerizing tetraethylene glycol diacrylate, polyethylene glycol diacrylate, trimethylolpropane triacrylate, and the like, and copolymers obtained by polymerizing two or more of these monomers or oligomers. Among them, polymers obtained by polymerizing acrylate monomers or methacrylate monomers are particularly preferred because they have a high rate of polymerization and high productivity.

Further, copolymers obtained by copolymerizing two or more monomers each having two or more acrylic groups in a monomer unit such as diacrylates and triacrylates or copolymers obtained by copolymerizing two or more monomers each having two or more methacrylic groups in a monomer unit such as dimethacrylates and trimethacrylates are particularly preferred because they can increase crosslink density to further increase the mechanical strength of the gel. Examples of the monomers containing an acryloyl group that can be used include monoacrylates such as methyl acrylate, acrylamide, 2-ethoxyethyl acrylate, diethylene glycol alkyl ether acrylates, polyethylene glycol alkyl ether acrylates, and 2-cyanoethyl acrylate, alkanediol diacrylates such as 1,2-butanediol diacrylate, 1,3-butanediol diacrylate, 1,4-butanediol diacrylate, neopentanediol diacrylate, and 1,6-hexanediol diacrylate, polyethylene glycol diacrylates such as ethylene glycol diacrylate, diethylene glycol diacrylate, triethylene glycol diacrylate, and tetraethylene glycol diacrylate, polypropylene glycol diacrylates such as propylene glycol diacrylate, dipropylene glycol diacrylate, tripropylene glycol diacrylate, and tetrapropylene glycol diacrylate, trimethylolpropane triacrylate, trimethylolpropane ethoxylate triacrylate, trimethylolpropane propoxylate triacrylate, isocyanuric acid ethoxylate triacrylate, glycerol ethoxylate triacrylate, glycerol propoxylate triacrylate, pentaerythritol ethoxylate tetraacrylate, and ditrimethylolpropane tetraacrylate. Examples of the monomers containing a methacryloyl group that can be used include ethylene glycol dimethacrylate, trimethylolpropane trimethacrylate, trimethylolpropane ethoxylate trimethacrylate, trimethylolpropane propoxylate trimethacrylate, pentaerythritol trimethacrylate, and pentaerythritol tetraacrylate.

The monomers each containing an acryloyl group and the monomers each containing a methacryloyl group can be polymerized by a conventional method, for example, by a method in which a polymerization initiator is not used, or a method in which a polymerization initiator is used. Examples of the method in which a polymerization initiator is not used include a method of directly applying radiation such as electron beams and γ-rays. Examples of the method in which a polymerization initiator is used include a method of adding an ultraviolet polymerization initiator such as a photosensitizer and irradiating with ultraviolet rays, a method of adding and heating a thermal polymerization initiator made of an organic substance, an oxide or the like, and a redox room temperature curing method using an oxidation-reduction polymerization initiator. Among them, an ultraviolet irradiation method is preferred in terms of allowing low temperature polymerization and curing in a short-time, and a thermal polymerization method is preferred in terms of requiring no special apparatus and being simple. Examples of the polymerization initiator in the ultraviolet irradiation method that can be used include benzoyl, benzyl, acetophenone, benzophenone, Michler's ketone, biacetyl, and benzoyl peroxide (BPO). Examples of the polymerization initiator in the thermal polymerization method that can be used include 1,1-di(tert-butylperoxy)-3, 3,5-trimethylcyclohexane, 2,2-bis-[4,4-di(tert-butylperoxycyclohexyl)propane], 1,1-di(tert-butylperoxy)-cyclohexane, tert-butyl peroxy-2-ethylhexanonate, benzoyl peroxide (BPO), and 2,2-azobisisobutyronitrile.

In the solid electrolyte 6, it is preferred that the mass ratio of the inorganic particles to the organic polymer be 99:1 to 95:5, and the volume ratio of the inorganic particles to the polymer gel to the organic polymer be in the range of 77:8:15 to 38:32:30. In this way, the inorganic particles and the polymer gel can be uniformly dispersed in the solid electrolyte 6 to form a conducting path of lithium ions over the whole solid electrolyte 6, thus capable of obtaining excellent lithium ion conductivity. Further, the organic polymer can bind the inorganic particles to reliably form a structure as the solid electrolyte 6.

In the electrolyte-positive electrode structure 7, the solid electrolyte 6 is joined to and integrated with the positive electrode active material layer 3 by the organic polymer.

The electrolyte-positive electrode structure 7 can be formed, for example, as follows. First, a paste prepared by mixing the inorganic particles and the organic polymer is cast on the positive electrode active material layer 3 of the positive electrode 4 by a casting method using a doctor blade followed by drying to thereby form a laminate made of the positive electrode 4 and a dried body 6a of the paste. Next, the resulting laminate is pressurized to thereby join and integrate the positive electrode 4 with the dried body 6a to form a joined body 7a.

Next, an electrolyte solution having lithium ion conductivity is mixed with a polymer powder constituting the polymer gel to prepare a sol-like liquid. Next, the resulting sol-like liquid is caused to penetrate into the joined body 7a under pressure to thereby impregnate the dried body 6a of the joined body 7a with the sol-like liquid, followed by natural air cooling to thereby cause the sol-like liquid to gel thereby capable of obtaining the electrolyte-positive electrode structure 7.

Alternatively, when a thermosetting polymer is used as a polymer gel containing an electrolyte solution having lithium ion conductivity, the following method may also be employed. First, an electrolyte solution having lithium ion conductivity, a monomer or an oligomer to be polymerized to a thermosetting polymer, and a thermal polymerization initiator are mixed and sufficiently stirred to prepare a gel precursor solution. The thermal polymerization initiator is mixed in a concentration of 0.1 to 1% by mass based on the monomer or the oligomer. Next, the resulting gel precursor solution can be impregnated into the dried body 6a of the joined body 7a followed by heating to thereby cause the gel precursor solution to gel to obtain the electrolyte-positive electrode structure 7. Here, the resulting gel precursor solution may be heated after it is impregnated into the dried body 6a of the joined body 7a in the state where the negative electrode 5 is adhered to the surface of the joined body 7a on the opposite side of the positive electrode active material layer 3. In this case, an electrolyte-positive electrode structure 7 in the state where it is incorporated into a lithium ion secondary battery 1 can be obtained.

In the solid electrolyte 6 of the electrolyte-positive electrode structure 7 of the present embodiment, the inorganic particles are bound by an organic polymer, and the organic polymer is impregnated with the polymer gel holding the electrolyte solution. Then, the solid electrolyte 6 is joined to and integrated with the positive electrode active material layer 3 formed on the positive electrode current collector 2 by the organic polymer. Thereby, the solid electrolyte 6 is supported by the positive electrode 4.

Therefore, according to the electrolyte-positive electrode structure 7 of the present embodiment, since the solid electrolyte 6 is not individually treated as in a conventional technique but can be treated in the state of being supported by the positive electrode 4, a desired strength can be ensured for the solid electrolyte 6, and the damage thereof can be avoided.

Further, according to the electrolyte-positive electrode structure 7 of the present embodiment, since the solid electrolyte 6 is not individually formed as in a conventional technique but can be formed in the state of being integrated with the positive electrode 4, the solid electrolyte 6 can be formed into a thin film so that it may have a thickness of, for example, 8 to 20 μm. As a result, according to the electrolyte-positive electrode structure 7 of the present embodiment, the thickness of the whole lithium ion secondary battery 1 can be reduced.

Further, in the electrolyte-positive electrode structure 7 of the present embodiment, since the contact between the solid electrolyte 6 and the positive electrode active material layer 3 is good, Li ions can easily conduct between the solid electrolyte 6 and the positive electrode active material layers 3 to reduce the interfacial resistance between the solid electrolyte 6 and the positive electrode active material layer 3 to suppress excess voltage, thus capable of developing excellent capacity and output when the structure is used in the lithium ion secondary battery 1.

The inorganic particles constituting the solid electrolyte 6 are made of a composite metal oxide which is represented by the above chemical formula and has a garnet structure, and they have a reduction potential in the range of −1.67 to −0.06V on the basis of the potential of $Li^+/Li$ electrode reaction. On the other hand, with respect to the high capacity material capable of occluding lithium ions constituting the negative electrode active material layer, for example, silicon has a reduction potential of 0.5 V; silicon oxide has a reduction potential of 0.5 V; and tin has a reduction potential of 1.0 V. That is, the inorganic particles have a lower reduction potential than the high capacity material capable of occluding lithium ions. Therefore, when the electrolyte-positive electrode structure 7 of the present embodiment is used in the lithium ion secondary battery 1, it can suppress the oxidation-reduction reaction at the interface of the solid electrolyte 6 and the negative electrode active material layer from occurring aside from the cell reaction and prevent the solid electrolyte 6 from being reduced and deteriorated.

Note that the reduction potential can be calculated by using a first-principles calculation method, specifically by using VASP (Vienna Ab initio Simulation Package) which is a first-principles electronic state calculation program under the conditions of a cutoff energy of 480 eV and a k point=3×3×3 by the GGA (Generalized Gradient Approximation)/PAW (Projector Augmented Wave) method.

Further, since the inorganic particles have lithium ion conductivity, a dendrite in the solid electrolyte 6 can be prevented from occurring with the repetition of charge and discharge.

Next, Examples and Comparative Examples of the present embodiment will be described.

EXAMPLES

Example 1

1. Production of Lithium Ion Secondary Battery (1) Preparation of Inorganic Particles In this Example, lithium hydroxide monohydrate was first subjected to dehydration treatment by heating at a temperature of 350° C. for 6 hours in a vacuum atmosphere to thereby obtain lithium hydroxide anhydride. Further, lanthanum oxide was subjected to dehydration and decarboxylation treatment by heating at a temperature of 950° C. for 24 hours in the atmospheric air.

Next, the resulting lithium hydroxide anhydride, the dehydrated and decarboxylated lanthanum oxide, and zirconium oxide were mixed in a molar ratio of Li:La:Zr=7.7:3:2 and ground and mixed for 3 hours at a number of revolutions of 360 rpm using a planetary ball mill to obtain a mixed raw material.

The resulting mixed raw material was received in an alumina crucible and subjected to primary firing by holding at a temperature of 900° C. for 6 hours in the atmospheric air to thereby obtain a powdered primary fired material.

Next, the resulting primary fired material was ground for 3 hours at a number of revolutions of 360 rpm using a planetary ball mill. Then, the ground primary fired material was received in an alumina crucible and subjected to secondary firing by holding at a temperature of 1050° C. for 6 hours in the atmospheric air to thereby obtain inorganic particles. The inorganic particles are made of a composite metal oxide which is represented by the chemical formula $Li_7La_3Zr_2O_{12}$ and has a garnet structure, and have lithium ion conductivity. Note that the chemical formula $Li_7La_3Zr_2O_{12}$ corresponds to the case of x=0 and y=0 in the $Li_{7-y}La_{3-x}A_xZr_{2-y}M_yO_{12}$. The resulting inorganic particles had a median diameter (d50) of 8.5 μm.

(2) Preparation of Paste Containing Inorganic Particles and Organic Polymer

Next, a 1.5 mass % carboxymethyl cellulose (CMC) aqueous solution was used as an organic polymer, and the resulting inorganic particles and the CMC aqueous solution were mixed in a mass ratio of 98:2 and stirred using a planetary centrifugal mixer to thereby obtain a mixture. Next, the resulting mixture was deaerated and then mixed using a thin-film spin mixer to thereby prepare a paste in which the inorganic particles and the CMC were dispersed as a paste containing inorganic particles and an organic polymer.

(3) Production of Positive Electrode

Next, a carbon-coated $LiFePO_4$ powder (trade name: SLFP-PD60, manufactured by Hohsen Corp.), acetylene black (trade name: DENKA BLACK (registered trademark) HS-100, manufactured by DENKI KAGAKU KOGYO K.K.) as a conductive aid, polyvinylidene fluoride (PVDF) (manufactured by KUREHA CORPORATION) as a binder, and N-methyl-2-pyrrolidinone (NMP) as a solvent were mixed in a mass ratio of 40.5:2.3:2.3:54.9 to obtain a mixed solution. Next, the resulting mixed solution was stirred for 30 minutes using a planetary centrifugal mixer to obtain a positive electrode mixture in which the $LiFePO_4$ powder, the DENKA BLACK, and the PVDF were dispersed in the NMP.

Next, a thin film made of the resulting positive electrode mixture was formed on a positive electrode current collector 2 made of an aluminum foil (Nippon Foil Mfg. Co., Ltd.) having a thickness of about 15 μm by a casting method using a doctor blade and then heated at 80° C. for 5 hours in atmospheric pressure to thereby evaporate the NMP to form a positive electrode active material layer 3 having a thickness of about 80 μm. As a result, a positive electrode 4 comprising a positive electrode active material layer 3 formed on a positive electrode current collector 2 was obtained.

(4) Production of Negative Electrode

A SUS 315L wire net (100 meshes, a wire diameter of 0.1 mm) having a diameter of 15 mm was used as a negative electrode current collector, on which a lithium metal foil having a thickness of 50 μm was pressure-bonded as a negative electrode active material layer to form a negative electrode 5.

(5) Production of Electrolyte-Positive Electrode Structure and Lithium Ion Secondary Battery Next, a thin film made of the paste containing the inorganic particles and the organic polymer was formed on the positive electrode active material layer 3 of the resulting positive electrode 4 by a casting method using a doctor blade and dried by heating at a temperature of 80° C. for 5 hours under atmospheric pressure, thus forming a laminate made of the positive electrode 4 and a dried body 6a of the paste. Next, the resulting laminate was cut into a circle shape having a diameter of 18 mm and pressurized with a pressure of 15 MPa to join and integrate the positive electrode 4 with the dried body 6a to produce a joined body 7a. In the dried body 6a of the resulting joined body 7a, the volume ratio of the inorganic particles to the CMC was 81.8:18.2.

Figure 2:
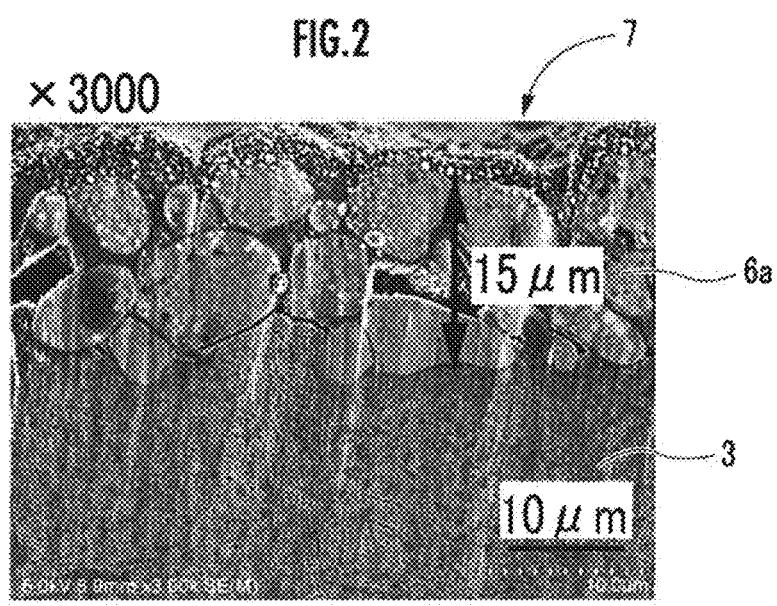
FIG. 2 is a cross-sectional image showing a joined surface of a joined body of Example 1

Next, the cross section of the joined body 7a was observed by SEM. FIG. 2 shows the cross-sectional image of the joined body 7a. FIG. 2 reveals that the dried body 6a made of the inorganic particles and the organic polymer is integrated with the positive electrode active material layer 3.

Next, the joined body 7a was dried at a temperature of 150° C. for 2 hours in a vacuum of 200 Pa to evaporate and remove the water contained in the paste in the dried body 6a.

Next, a gel precursor solution to be impregnated into the joined body 7a from which water was evaporated was prepared as follows. First, $LiPF_6$ as a supporting electrolyte was dissolved in a concentration of 1.0 mol/L in an organic solvent in which ethylene carbonate (EC) and diethyl carbonate (DEC) were mixed in a volume ratio of 3:7 to prepare an electrolyte solution having lithium ion conductivity. Next, 84.4 parts by mass of the resulting electrolyte solution, 14.9 parts by mass of polyethylene glycol diacrylate (a weight average molecular weight of 250), and 0.7 part by mass of benzoyl peroxide (BPO) were mixed, and the mixture was stirred at a temperature of 10° C. for 20 minutes at 400 rpm using a cooled stirrer to prepare a gel precursor solution. The preparation was performed in a glove box in an argon atmosphere.

Next, the joined body 7a from which water was evaporated was immersed in the resulting gel precursor solution at a reduced pressure of 50 kPa to thereby impregnate the gel precursor solution into the dried body 6a of the joined body 7a.

Next, in the joined body 7a impregnated with the gel precursor solution, the negative electrode 5 was adhered to the surface of the dried body 6a on the opposite side to the positive electrode active material layer 3, and the resulting joined body 7a was then received and sealed in a SUS 316 coin cell member (trade name: CR2032, manufactured by TOYO SYSTEM Co., Ltd.) having a diameter of 20 mm and a height of 3.2 mm.

Next, the coin cell member was heated at a temperature of 70° C. for 40 minutes to thereby polymerize the polymer in the gel precursor solution impregnated into the dried body 6a of the joined body 7a to form a gel.

According to the procedures as described above, there was produced a lithium ion secondary battery 1 comprising the electrolyte-positive electrode structure 7 in which the solid electrolyte 6 containing the inorganic particles, the polymer gel, and the organic polymer is integrated with the positive electrode active material layer 3 of the positive electrode 4.

2. Measurement of the Thickness of Solid Electrolyte

The resulting lithium ion secondary battery 1 was subjected to measurement of the thickness of the dried body 6a in the cross-sectional image of FIG. 2 as the thickness of the solid electrolyte 6 of the electrolyte-positive electrode structure 7, and the thickness was found to be 15 μm.

3. Evaluation of the Cycle Performance of Lithium Ion Secondary Battery

The lithium ion secondary battery 1 comprising the electrolyte-positive electrode structure 7 obtained in this Example was mounted on an electrochemical measuring apparatus (manufactured by Toho Technical Research Co., Ltd.). Next, the operation of charging until the cell voltage reaches 4.0 V by applying current between the positive electrode 4 and the negative electrode 5 and then discharging until the cell voltage reaches 2.5 V was repeated for 5 cycles at a temperature of 25° C. The application of current was performed at a current density of 0.375 mA/cm$^2$.

Figure 3:
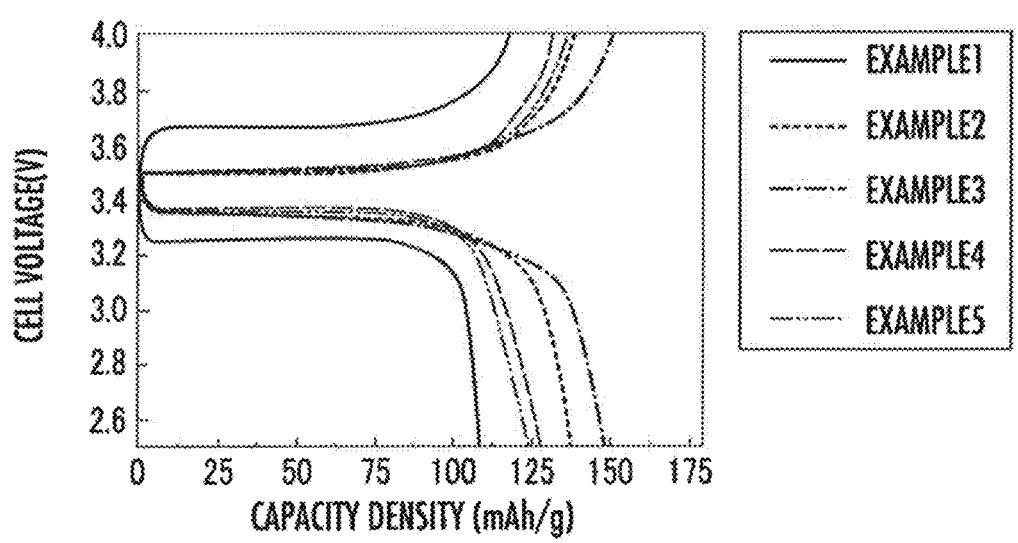
FIG. 3 is a graph showing the relationship between the charge and discharge capacity density and cell voltage in the first cycle of the lithium ion secondary batteries of Examples 1 to 5.
Figure 4:
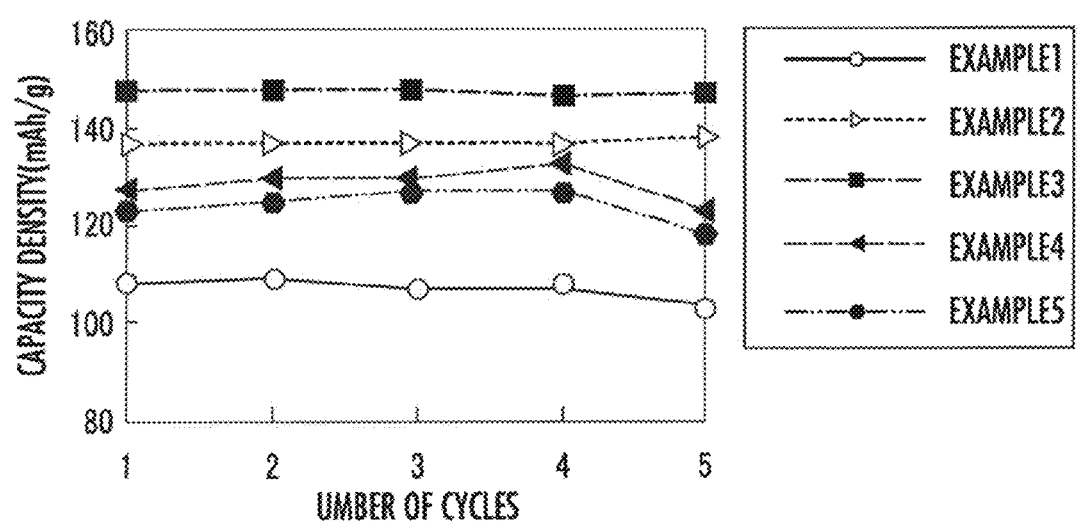
FIG. 4 is a graph showing the discharge capacity density at the completion of each cycle of the lithium ion secondary batteries of Examples 1 to 5.
Figure 5:
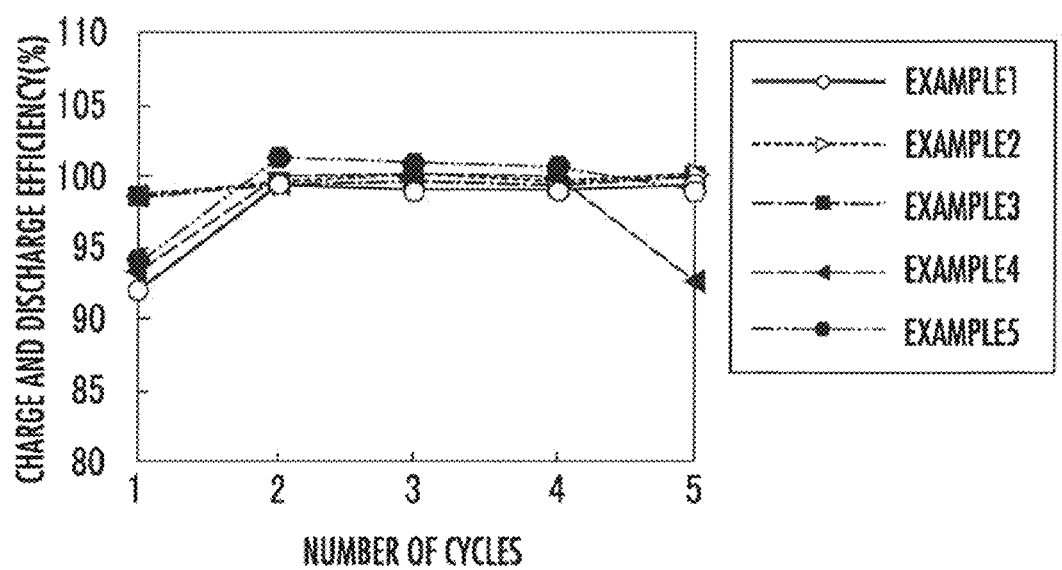
FIG. 5 is a graph showing the cycle performance of the lithium ion secondary batteries of Examples 1 to 5.

FIG. 3 shows the relationship between the discharge capacity density or the charge capacity density and cell voltage in the first cycle; FIG. 4 shows the discharge capacity density at the completion of each cycle; and FIG. 5 shows the charge and discharge efficiency at the completion of each cycle as the cycle performance. The charge and discharge efficiency is a value obtained by multiplying the ratio of the discharge capacity density to the charge capacity density by 100.

Example 2 to Example 8

1. Production of Lithium Ion Battery

Next, lithium ion secondary batteries 1 were produced as Examples 2 to 8 by using pulverized inorganic particles and changing raw materials of the gel precursor solution to be impregnated into the joined body 7a.

First, inorganic particles made of a composite metal oxide which is represented by the chemical formula $Li_7La_3Zr_2O_{12}$ and has a garnet structure were prepared by exactly the same method as in Example 1. The resulting inorganic particles had an average particle size of 8.5 μm.

Next, the resulting inorganic particles were ground in the following procedures to obtain pulverized inorganic particles.

First, non-pulverized inorganic particles and isopropyl alcohol were mixed in a mass ratio of 30:70 to obtain a mixture containing non-pulverized inorganic particles. Next, the mixture containing the non-pulverized inorganic particles was subjected to grinding treatment for 45 minutes using zirconia beads having a diameter of 0.5 mm in a wet bead mill grinding apparatus (trade name: Star Mill Labstar Mini LMZ015, Ashizawa Finetech Ltd.) to obtain a mixture in which pulverized inorganic particles were dispersed in isopropyl alcohol.

Next, the mixture containing pulverized inorganic particles was subjected to measurement of the median diameter (d50) of the pulverized inorganic particles by a laser diffraction and scattering method using a particle size distribution measuring device (trade name: Microtrac MT3000, manufactured by Nikkiso Co., Ltd.), and the median diameter was found to be 0.566 μm.

Next, the mixture containing pulverized inorganic particles was subjected to suction filtration. Then, a residue remaining on filter paper was heated at a temperature of 200° C. for 24 hours in a vacuum atmosphere to thereby remove isopropyl alcohol remaining in the residue, thereby obtaining pulverized inorganic particles.

Next, a paste in which pulverized inorganic particles and CMC were dispersed was prepared in exactly the same manner as in Example 1 except that the pulverized inorganic particles obtained in these Examples were used.

Next, a joined body 7a was produced in exactly the same manner as in Example 1 except that the paste obtained in these Examples was used, and the water contained in the paste in the dried body 6a of the joined body 7a was removed by evaporation. In the dried body 6a of the resulting joined body 7a, the volume ratio of the inorganic particles to the CMC was 81.8:18.2.

Figure 6:
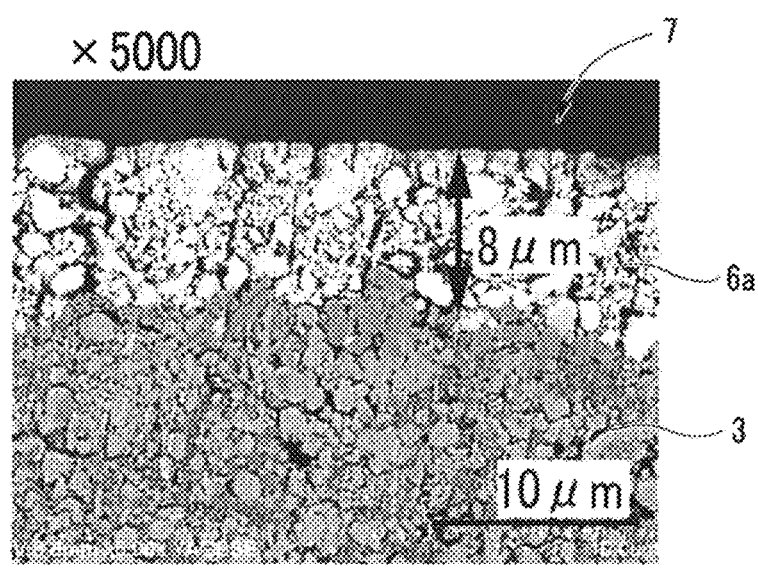
FIG. 6 is a cross-sectional image showing a joined surface of a joined body of Example 2.

Next, the cross section of the joined body 7a was observed by SEM. FIG. 6 shows the cross-sectional image of the joined body 7a of Example 2. FIG. 6 reveals that the dried body 6a made of the inorganic panicles and the organic polymer is integrated with the positive electrode active material layer 3.

Next, the gel precursor solution was prepared in exactly the same manner as in Example 1 except that the type of polymers mixed with the electrolyte solution was changed in Examples 2 to 5, and the organic solvent constituting the electrolyte solution was changed in Examples 6 to 8.

In Example 2, 84.4 parts by mass of the electrolyte solution prepared in exactly the same manner as in Example 1, 14.9 parts by mass of ethylene glycol dimethacrylate (a weight average molecular weight of 198), and 0.7 part by mass of the benzoyl peroxide were mixed to prepare a gel precursor solution.

In Example 3, 89.6 parts by mass of the electrolyte solution prepared in exactly the same manner as in Example 1, 9.7 pans by mass of the ethylene glycol dimethacrylate, and 0.7 part by mass of the benzoyl peroxide were mixed to prepare a gel precursor solution.

In Example 4, 89.6 parts by mass of the electrolyte solution prepared in exactly the same manner as in Example 1, 9.7 parts by mass of pentaerythritol trimethacrylate (a weight average molecular weight of 338), and 0.7 part by mass of the benzoyl peroxide were mixed to prepare a gel precursor solution.

In Example 5, 94.5 parts by mass of the electrolyte solution prepared in exactly the same manner as in Example 1, 4.8 parts by mass of the pentaerythritol trimethacrylate, and 0.7 part by mass of the benzoyl peroxide were mixed to prepare a gel precursor solution.

In Example 6, 84.4 parts by mass of the electrolyte solution prepared by dissolving $LiPF_6$ as a supporting electrolyte in a concentration of 1.0 mol/L in an organic solvent composed of ethylene carbonate, 14.9 parts by mass of the ethylene glycol dimethacrylate, and 0.7 part by mass of the benzoyl peroxide were mixed to prepare a gel precursor solution.

In Example 7, 84.4 parts by mass of the electrolyte solution prepared by dissolving $LiN(SO_2CF_3)_2$ as a supporting electrolyte in a concentration of 1.0 mol/L in an organic solvent composed of ethylene carbonate, 14.9 parts by mass of the ethylene glycol dimethacrylate, and 0.7 part by mass of the benzoyl peroxide were mixed to prepare a gel precursor solution.

In Example 8, 84.4 parts by mass of the electrolyte solution prepared by dissolving $LiN(SO_2CF_3)_2$ as a supporting electrolyte in a concentration of 1.0 mol/L in an organic solvent in which ethylene carbonate and 1,2-dimethoxyethane (DME) were mixed in a volume ratio of 3:7, 14.9 parts by mass of the ethylene glycol dimethacrylate, and 0.7 part by mass of the benzoyl peroxide were mixed to prepare a gel precursor solution.

Next, there were produced lithium ion secondary batteries 1 of Examples 2 to 8 each comprising the electrolyte-positive electrode structure 7 in which the solid electrolyte 6 containing the inorganic particles, the polymer gel, and the organic polymer was integrated with the positive electrode active material layer 3 of the positive electrode 4 in exactly the same manner as in Example 1 except that the gel precursor solution of each Example was used.

2. Measurement of the Thickness of Solid Electrolyte

The lithium ion secondary battery 1 of Example 2 was subjected to measurement of the thickness of the dried body 6a in the cross-sectional image of FIG. 6 as the thickness of the solid electrolyte 6 of the electrolyte-positive electrode structure 7, and the thickness was found to be 8 µm.

Further, the lithium ion secondary batteries 1 of Examples 3 to 8 were subjected to measurement of the thickness of the solid electrolyte 6 in the same manner, and the thickness was found to be 8 µm.

3. Evaluation of the Cycle Performance of Lithium Ion Secondary Battery

The operation of charging and discharging was repeated for 5 cycles in exactly the same manner as in Example 1 except that each of the lithium ion secondary batteries 1 of Examples 2 to 8 was used, and each battery was charged until the cell voltage reached 3.9 V and then discharged until the cell voltage reached 2.5 V.

With respect to the lithium ion secondary batteries 1 of Examples 2 to 5, FIG. 3 shows the relationship between the discharge capacity density or the charge capacity density and the cell voltage in the first cycle; FIG. 4 shows the discharge capacity density at the completion of each cycle; and FIG. 5 shows the charge and discharge efficiency at the completion of each cycle as the cycle performance.

Figure 7:
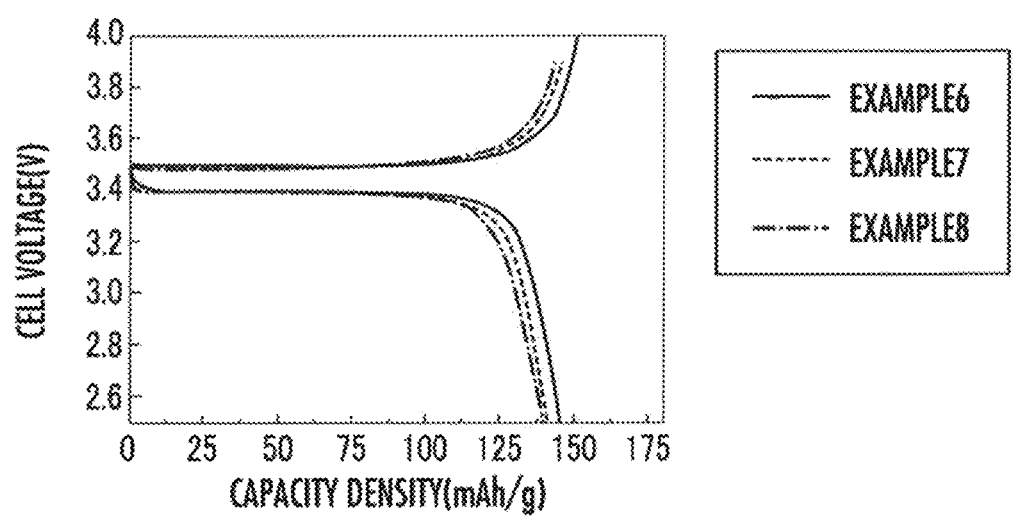
FIG. 7 is a graph showing the relationship between the charge and discharge capacity density and cell voltage in the first cycle of the lithium ion secondary batteries of Examples 6 to 8.
Figure 8:
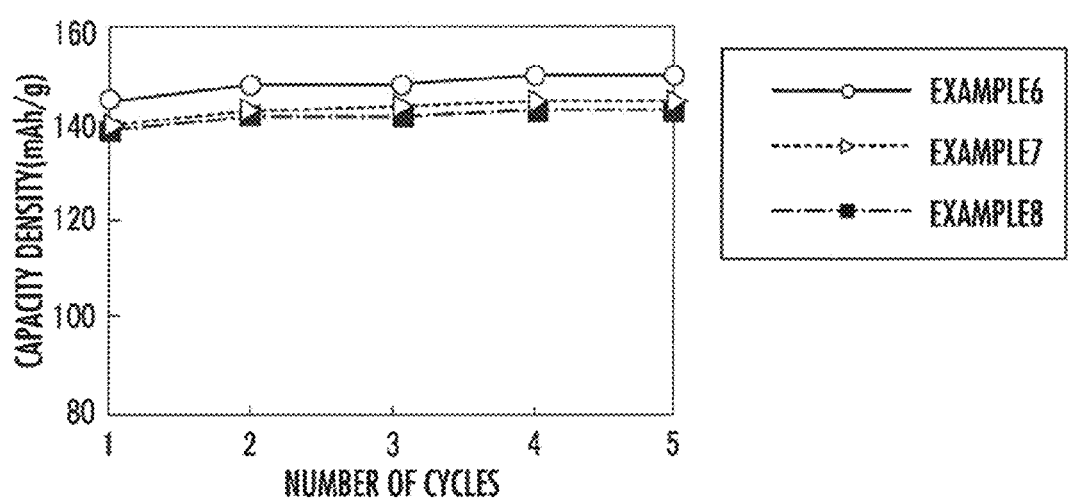
FIG. 8 is a graph showing the discharge capacity density at the completion of each cycle of the lithium ion secondary batteries of Examples 6 to 8.

With respect to the lithium ion secondary batteries 1 of Examples 6 to 8, FIG. 7 shows the relationship between the discharge capacity density or charge capacity density and the cell voltage in the first cycle; FIG. 8 shows the discharge capacity density at the completion of each cycle; and FIG. 9 shows the charge and discharge efficiency at the completion of each cycle as the cycle performance.

FIG. 3 and FIG. 7 reveal that the lithium ion secondary batteries 1 of Examples 1 to 8 each can maintain a predetermined cell voltage during the discharge and the charge in the first cycle.

FIG. 4 and FIG. 8 reveal that the lithium ion secondary batteries 1 of Examples 1 to 8 each show stable charge and discharge behavior in any of the first to the fifth cycle and have excellent cycle performance.

Figure 9:
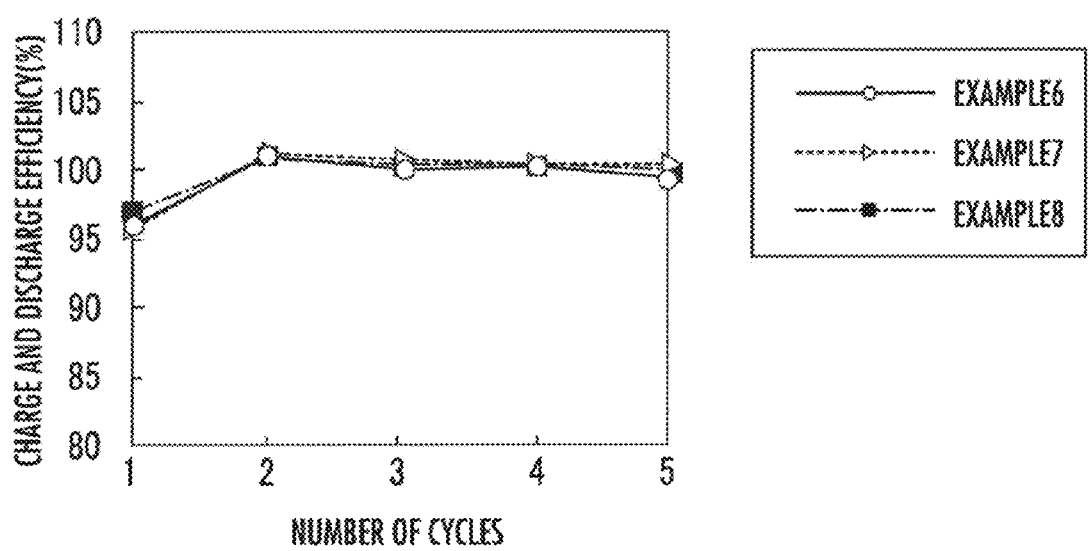
FIG. 9 is a graph showing the cycle performance of the lithium ion secondary batteries of Examples 6 to 8.

FIG. 5 and FIG. 9 reveal that the lithium ion secondary batteries 1 of Examples 1 to 8 each have a charge and discharge efficiency of 90% or more in any of the first to the fifth cycle and have excellent charge and discharge efficiency.

From the above, it is apparent that the lithium ion secondary batteries 1 of Examples 1 to 8 in which the solid electrolyte 6 has a thickness of 8 to 15 µm have excellent capacity and output.

Example 9 to Example 11

1. Production of Lithium Ion Battery

Next, in Examples 9 to 11, lithium ion secondary batteries 1 were produced in exactly the same manner as in Example 2 except that inorganic particles having different compositions were used.

In Example 9, dehydrated and decarboxylated lanthanum oxide, lithium carbonate, zirconium oxide, yttrium oxide, and tantalum oxide were first mixed in a molar ratio of Li:La:Y:Zr:Ta=7.7:2.95:0.05:1.8:0.2 and ground and mixed for 3 hours at a number of revolutions of 360 rpm using a planetary ball mill to obtain a mixed raw material. The lanthanum oxide was subjected to dehydration and decarboxylation by heating at a temperature of 950° C. for 24 hours in the atmospheric air.

Next, the resulting mixed raw material was received in an alumina crucible and subjected to primary firing by holding at a temperature of 900° C. for 6 hours in the atmospheric air to thereby obtain a powdered primary fired material.

Next, the resulting primary fired material was ground for 3 hours at a number of revolutions of 480 rpm using a planetary ball mill. Then, the ground primary fired material was received in an alumina crucible and subjected to secondary firing by holding at a temperature of 1050° C. for 11 hours in the atmospheric air to thereby obtain inorganic particles. The inorganic particles are made of a composite metal oxide which is represented by the chemical formula $Li_{6.8}La_{2.95}Y_{0.05}Zr_{1.8}Ta_{0.2}O_{12}$ and has a garnet structure, and have lithium ion conductivity. Note that the chemical formula $Li_{6.8}La_{2.95}Y_{0.05}Zr_{1.8}Ta_{0.2}O_{12}$ corresponds to the case of A=Y, x=0.05, and M=Ta, y=0.2 in the $Li_{7-y}La_{3-x}A_xZr_{2-y}M_yO_{12}$. The resulting inorganic particles had a median diameter (d50) of 2.3 µm.

In Example 10, inorganic particles were obtained in exactly the same manner as in Example 9 except that dehydrated and decarboxylated lanthanum oxide, lithium carbonate, zirconium oxide, yttrium oxide, and tantalum oxide were mixed in a molar ratio of Li:La:Y:Zr:Ta=7.7:2.87:0.13:1.8:0.2.

The inorganic particles are made of a composite metal oxide which is represented by the chemical formula $Li_{6.8}La_{2.87}Y_{0.13}Zr_{1.8}Ta_{0.2}O_{12}$ and has a garnet structure, and have lithium ion conductivity. Note that the chemical formula $Li_{6.8}La_{2.87}Y_{0.13}Zr_{1.8}Ta_{0.2}O_{12}$ corresponds to the case of A=Y, x=0.13, and M=Ta, y=0.2 in the $Li_{7-y}La_{3-x}A_xZr_{2-y}M_yO_{12}$. The resulting inorganic particles had a median diameter (d50) of 2.3 µm.

In Example 11, inorganic particles were obtained in exactly the same manner as in Example 9 except that dehydrated and decarboxylated lanthanum oxide, lithium carbonate, zirconium oxide, yttrium oxide, and tantalum oxide were mixed in a molar ratio of Li:La:Y:Zr:Ta=7.7:2.9:0.1:1.6:0.4.

The inorganic particles are made of a composite metal oxide which is represented by the chemical formula $Li_{6.6}La_{2.9}Y_{0.1}Zr_{1.6}Ta_{0.4}O_{12}$ and has a garnet structure, and have lithium ion conductivity. Note that the chemical formula $Li_{6.6}La_{2.9}Y_{0.1}Zr_{1.6}Ta_{0.4}O_{12}$ corresponds to the case of A=Y, x=0.1, and M=Ta, y=0.4 in the $Li_{7-y}La_{3-x}A_xZr_{2-y}M_yO_{12}$. The resulting inorganic particles had a median diameter (d50) of 2.3 μm.

Next, lithium ion secondary batteries 1 were produced in exactly the same manner as in Example 2 except that the inorganic particles of Examples 9 to 11 were used.

2. Measurement of the Thickness of Solid Electrolyte

The lithium ion secondary batteries 1 of Examples 9 to 11 were subjected to measurement of the thickness of the dried body 6a in the cross-sectional image by SEM as the thickness of the solid electrolyte 6 of the electrolyte-positive electrode structure 7, and the thickness was found to be 8 μm.

3. Evaluation of the Cycle Performance of Lithium Ion Secondary Battery

The operation of charging and discharging was repeated for 5 cycles in exactly the same manner as in Example 2 using the lithium ion secondary batteries 1 of Examples 9 to 11.

Figure 10:
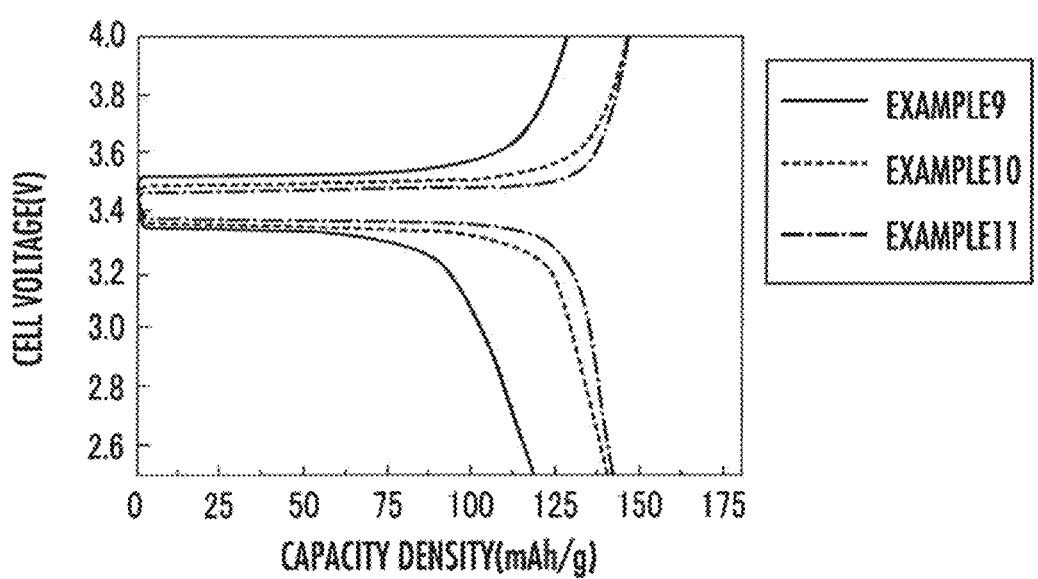
FIG. 10 is a graph showing the relationship between the charge and discharge capacity density and cell voltage in the first cycle of the lithium ion secondary batteries of Examples 9 to 12.
Figure 11:
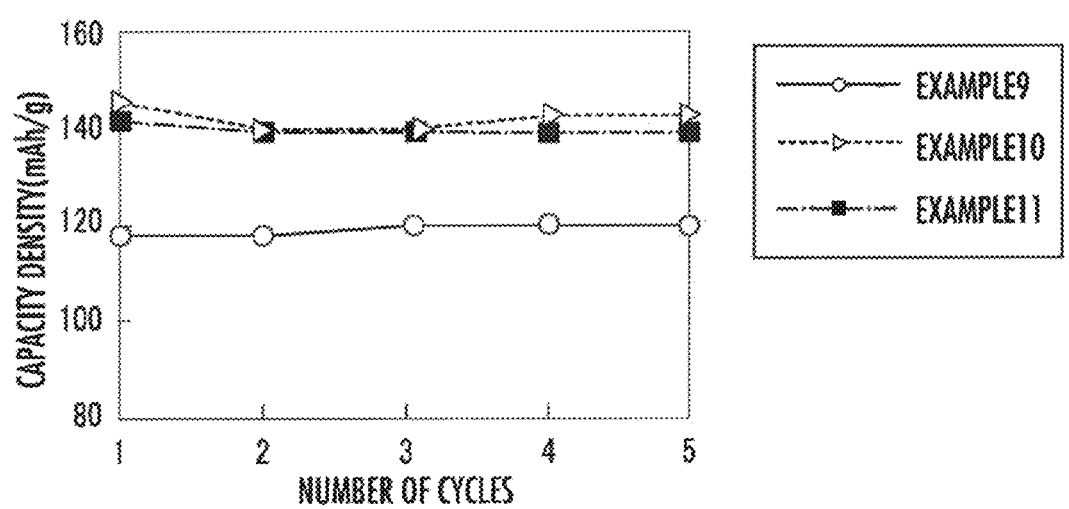
FIG. 11 is a graph showing the discharge capacity density at the completion of each cycle of the lithium ion secondary batteries of Examples 9 to 12.

FIG. 10 shows the relationship between the discharge capacity density or the charge capacity density and the cell voltage in the first cycle; FIG. 11 shows the discharge capacity density at the completion of each cycle; and FIG. 12 shows the charge and discharge efficiency at the completion of each cycle as the cycle performance.

FIG. 10 reveals that the lithium ion secondary batteries 1 of Examples 9 to 11 each can maintain a predetermined cell voltage during the discharge and the charge in the first cycle.

FIG. 11 reveals that the lithium ion secondary batteries 1 of Examples 9 to 1 each show stable charge and discharge behavior in any of the first to the fifth cycle and have excellent cycle performance.

Figure 12:
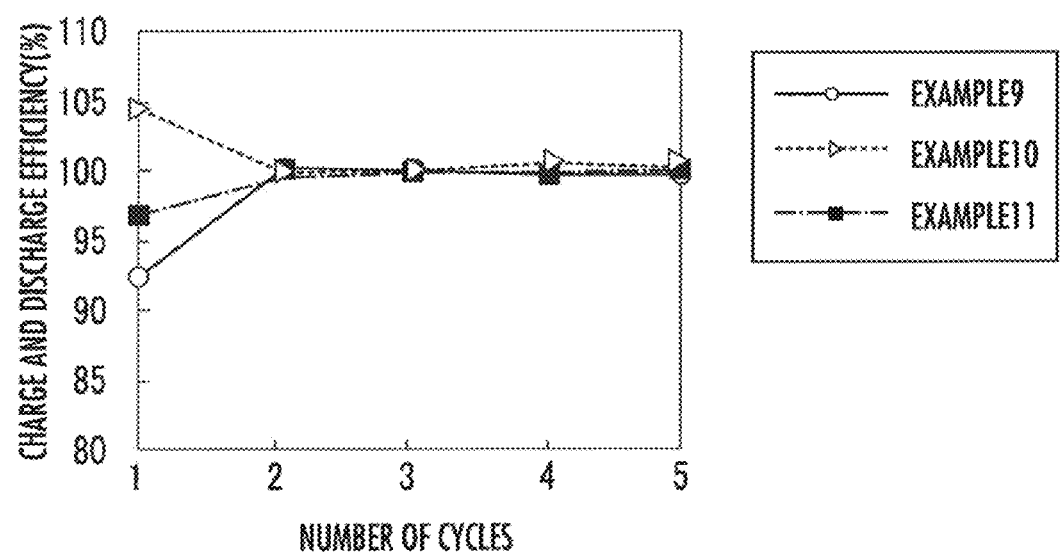
FIG. 12 is a graph showing the cycle performance of the lithium ion secondary batteries of Examples 9 to 12.

FIG. 12 reveals that the lithium ion secondary batteries 1 of Examples 9 to 11 each have a charge and discharge efficiency of 90% or more in any of the first to the fifth cycle and have excellent charge and discharge efficiency.

From the above, it is apparent that the lithium ion secondary batteries 1 of Examples 9 to 11 each comprising an electrolyte-positive electrode structure 7, in which a solid electrolyte 6 is integrated with a positive electrode active material layer 3, and the solid electrolyte 6 has a thickness of 8 μm, have excellent capacity and output.

Comparative Example 1

Next, as in a conventional technique, it was attempted to produce a lithium ion secondary battery by individually producing a solid electrolyte and sandwiching the resulting solid electrolyte between a positive electrode and a negative electrode. In this Comparative Example, in order to produce the solid electrolyte, a paste containing the inorganic particles and the organic polymer was first prepared in exactly the same manner as in Example 1. The resulting paste was used to form a thin film on a glass substrate by a casting method using a doctor blade. The thin film was formed so as to have a thickness after drying of 15 μm. Next, when the resulting thin film was peeled off from the glass substrate, the thin film was damaged, and a solid electrolyte was not able to be obtained. Therefore, a lithium ion secondary battery was not able to be produced.

REFERENCE SIGNS LIST

1 . . . lithium ion secondary battery, 2 . . . current collector (positive electrode current collector), 3 . . . positive electrode active material layer, 4 . . . positive electrode, 6 . . . solid electrolyte, 7 . . . electrolyte-positive electrode structure.

What is claimed is:

1. An electrolyte-positive electrode structure used in a lithium ion secondary battery, the electrolyte-positive electrode structure comprising:
   a positive electrode comprising a positive electrode active material layer formed on a current collector, and a solid electrolyte containing inorganic particles having lithium ion conductivity, said particles being made of a composite metal oxide which is represented by the chemical formula $Li_{7-y}La_{3-x}A_xZr_{2-y}M_yO_{12}$ (wherein A is any one metal selected from the group consisting of Y, Nd, Sm, and Gd; x is in the range of $0 \leq x < 3$: M is Nb or Ta; and y is in the range of $0 \leq y < 2$) and has a garnet structure,
   an organic polymer, and
   a polymer gel, in which the organic polymer binds the inorganic particles and can be impregnated with the polymer gel, and the polymer gel holds an electrolyte solution having lithium ion conductivity and is impregnated into the organic polymer,
   wherein the positive electrode active material layer is integrated with the solid electrolyte using the organic polymer as a medium.

2. The electrolyte-positive electrode structure according to claim 1, wherein the inorganic particles are made of a composite metal oxide which is represented by the chemical formula $Li_{-2}La_3A_xZr_2O_{12}$ and has a garnet structure.

3. The electrolyte-positive electrode structure according to claim 1, wherein the inorganic particles are made of a composite metal oxide which is represented by the chemical formula $Li_{7-y}La_{3-x}Y_xZr_{2-y}Ta_yO_{12}$ (wherein x is in the range of $0 \leq x < 3$, and y is in the range of $0 \leq y < 2$) and has a garnet structure.

4. The electrolyte-positive electrode structure according to claim 3, wherein the inorganic particles are made of a composite metal oxide which is represented by the chemical formula $Li_{6.8}La_{2.95}Y_{0.05}Zr_{1.18}Ta_{0.2}O_{12}$ and has a garnet structure.

5. The electrolyte-positive electrode structure according to claim 3, wherein the inorganic particles are made of a composite metal oxide which is represented by the chemical formula $Li_{6.8}La_{2.87}Y_{0.13}Zr_{1.8}Ta_{0.2}O_{12}$ and has a garnet structure.

6. The electrolyte-positive electrode structure according to claim 3, wherein the inorganic particles are made of a composite metal oxide which is represented by the chemical formula $Li_{6.6}La_{2.9}Y_{0.1}Zr_{1.6}Ta_{0.4}O_{12}$ and has a garnet structure.

7. The electrolyte-positive electrode structure according to claim 1, wherein the inorganic particles have a particle size in the range of 0.5 to 20 μm.

8. The electrolyte-positive electrode structure according to claim 7, wherein the inorganic particles have a particle size in the range of 0.5 to 10 μm.

9. The electrolyte-positive electrode structure according to claim 1, wherein the organic polymer is carboxymethyl cellulose.

10. The electrolyte-positive electrode structure according to claim 1, wherein the electrolyte solution comprises a lithium salt and an organic solvent which dissolves the lithium salt, wherein the lithium salt is one salt selected from the group consisting of $LiPF_6$ and $LiN(CF_3SO_2)_2$, and the organic solvent is one or more solvents selected from the group consisting of ethylene carbonate, diethyl carbonate, and 1,2-dimethoxy ethane.

11. The electrolyte-positive electrode structure according to claim 1, wherein the polymer gel is one monomer selected from the group consisting of polyethylene glycol diacrylate, ethylene glycol dimethacrylate, and pentaerythritol trimethacrylate.

12. The electrolyte-positive electrode structure according to claim 1, wherein the solid electrolyte has a thickness in the range of 8 to 20 μm.

13. The electrolyte-positive electrode structure according to claim 12, wherein the solid electrolyte has a thickness in the range of 8 to 15 μm.

14. A lithium ion secondary battery comprising an electrolyte-positive electrode structure, the electrolyte-positive electrode structure comprising:

a positive electrode comprising a positive electrode active material layer formed on a current collector, and a solid electrolyte containing inorganic particles having lithium ion conductivity, said particles being made of a composite metal oxide which is represented by the chemical formula $Li_{7-y}La_{3-x}A_xZr_{2-y}M_yO_{12}$ (wherein A is any one metal selected from the group consisting of Y, Nd, Sm, and Gd; x is in the range of $0 \le x < 3$: M is Nb or Ta; and y is in the range of $0 \le y < 2$) and has a garnet structure, an organic polymer, and a polymer gel, in which the organic polymer binds the inorganic particles and can be impregnated with the polymer gel, and the polymer gel holds an electrolyte solution having lithium ion conductivity and is impregnated into the organic polymer, wherein the positive electrode active material layer is integrated with the solid electrolyte using the organic polymer as a medium.

* * * * *